April 13, 1954  R. W. MASON  2,675,282
BALL BEARING
Filed July 29, 1950
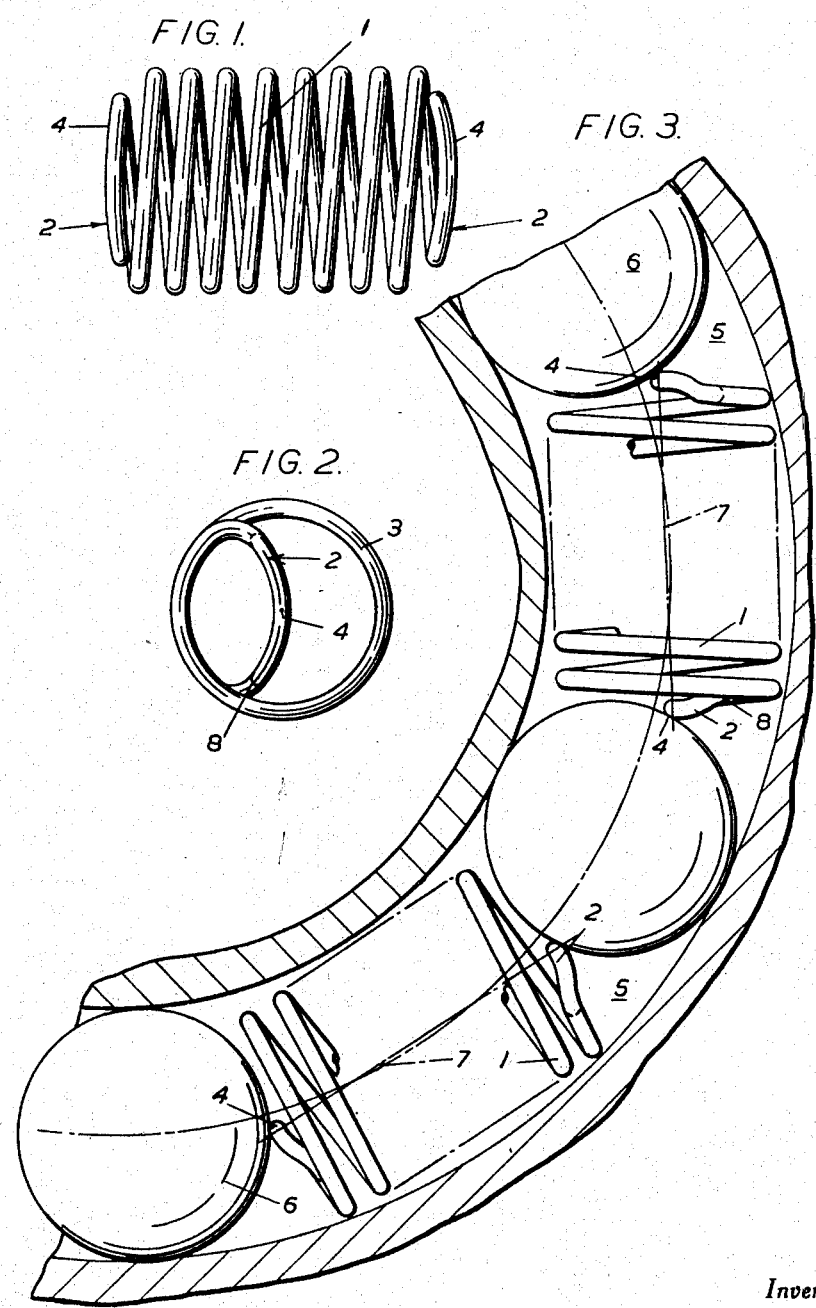
Inventor
RONALD WILLIAM MASON
By
Herbert H. Thompson
his Attorney.

Patented Apr. 13, 1954

2,675,282

UNITED STATES PATENT OFFICE 2,675,282

BALL BEARING

Ronald William Mason, Isleworth, England, assignor to The Sperry Gyroscope Company Limited, Brentford, England, a British company Application July 29, 1950, Serial No. 176,631

Claims priority, application Great Britain August 11, 1949

1 Claim. (Cl. 308—199)

The present invention relates to ball bearings and has for its object the provision of improvements therein. More particularly, the invention is concerned with ball bearings of the type in which the balls are spaced apart in a curved race with inner and outer parts by means of helical springs.

In ball bearings of this type, the number of balls in the race is materially reduced compared with a conventional cage-less bearing and therefore the number of contact points between balls and race is similarly reduced. However, in the previously known bearings, the helical springs were substantially in the form of a cylinder and the end turn formed a plane end to the cylinder and engaged the surface of the ball, so that the friction present was considerable.

It is the more specific object of the present invention to reduce the friction between the spacer springs and the balls in this type of bearing.

Accordingly, the present invention provides a ball bearing of the type in which the balls are spaced by means of helical springs, characterised by the fact that each end of each spring is bent to pass across the plane of the end convolution in an arc that is bowed convexly outwards and the springs are of such length and diameter that they fit loosely into the race between the balls, and the bowed arcs at their ends make contact with the balls each at a point substantially on the longitudinal axis of the spring.

In order that the invention may be more readily understood, reference will now be made to the accompanying drawings which show one constructional embodiment by way of example and in which:

Fig. 1 shows a front view of a spacer spring according to the invention,

Fig. 2 shows an end view of the spacer spring, and

Fig. 3 shows the spacer spring in position in a ball-bearing.

As shown in the drawings the balls 6 are arranged in relatively spaced relation between the inner and outer races of the bearing, the spacing between the balls being maintained by means of a plurality of helical springs 1. Each of the helical springs is made from the usual spring wire, such as a high grade piano wire, and each end portion 2 of the end convolutions is bent to form a bow which extends in a curved manner transversely of and substantially through the longitudinal axis of the spring (see Fig. 2). The bow is further bent to curve in an outwardly convex manner in the direction of the longitudinal axis of the spring (see Fig. 1) and the apex 4 of this bow lies substantially on the longitudinal axis of the spring so that it contacts its associated ball at a point thereon which lies substantially on the longitudinal axis 7 of the spring 1. (See Fig. 3.)

The springs 1 are of such length and diameter that they fit loosely into the race 5 (Fig. 3) in compression between the balls 6, and the bowed arcs 4 at their ends make contact with the balls each at a point substantially on the longitudinal axis 7 of the spring 1. The two bent ends of each spring are in the same lateral half of the spring, such ends being arranged in the bearing adjacent the outer part of the race.

It will thus be seen that the area of contact between each spring and its associated ball is only that of the end 4 and that this area is very much smaller than the whole end turn as in the prior arrangements so that the friction is considerably reduced compared with known bearings of this type.

Preferably the tips 3 (Fig. 2) of the spring ends are smoothed by grinding or the like.

It will be understood that the invention has been described solely by way of example and that various modifications of detail could be made without departing from the scope thereof.

What is claimed is:

A ball bearing comprising inner and outer races, a plurality of balls located in spaced relation to one another between said races, a plurality of helical springs adapted to maintain the spacing between said balls, each of said springs having the end portions of its end convolutions bent to form a bow extending in a curved manner substantially transversely of and through the longitudinal axis of the spring, said bow being further bent to curve convexly outwardly in the direction of said longitudinal axis, so that the apex of each bow and the adjacent balls will provide oppositely curving surfaces providing a single point contact only therebetween, said bows lying in the same lateral half of the spring, and the diameter of said spring convolutions being so dimensioned as to fit loosely between said races and in compression between said balls.

References Cited in the file of this patent

FOREIGN PATENTS

| Number | Country | Date |
|---|---|---|
| 12,206 | Great Britain | 1903 |